United States Patent [19]
Barrett et al.

[11] 3,933,390
[45] Jan. 20, 1976

[54] ATTACHMENT DEVICES FOR UNDERWATER SALVAGE

[75] Inventors: Frederick B. Barrett, Camarillo; Peter A. Nielsen, Ventura, both of Calif.

[73] Assignee: The United States of America as represented by the Secretary of the Navy, Washington, D.C.

[22] Filed: May 22, 1974

[21] Appl. No.: 472,010

[52] U.S. Cl. ................. 294/94; 85/3 R; 294/66 R; 294/97
[51] Int. Cl.² .......................................... B66C 1/42
[58] Field of Search ......................... 294/89, 93–97, 294/115, 116, 66 R; 52/160, 161; 85/3 R, 3 K, 3 S, 5 M, 66, 67, 73, 74, 76, 79, 80

[56] References Cited
UNITED STATES PATENTS

| | | | |
|---|---|---|---|
| 976,325 | 11/1910 | Wheeler et al. | 294/94 X |
| 1,584,851 | 5/1926 | Crone | 85/3 S |
| 2,132,284 | 10/1938 | Bonham | 85/3 S |
| 2,318,548 | 5/1943 | Whitehead et al. | 85/3 R |
| 2,494,159 | 1/1950 | Bernstein | 85/3 R X |
| 2,610,888 | 9/1952 | Pace | 294/93 |
| 2,733,629 | 2/1956 | Vogt | 85/3 S |
| 2,988,396 | 6/1961 | Davies | 294/93 |
| 3,312,138 | 4/1967 | Cumming | 85/66 |
| 3,404,503 | 10/1968 | Courtois et al. | 294/89 X |
| 3,534,650 | 10/1970 | Kubokawa | 85/3 S |

*Primary Examiner*—Evon C. Blunk
*Assistant Examiner*—Johnny D. Cherry
*Attorney, Agent, or Firm*—Richard S. Sciascia; Joseph M. St.Amand; David O'Reilly

[57] ABSTRACT

An attachment device for underwater salvage operations which has an elongated cylindrical body and a plurality of extendable lugs supported in one or more apertures near the tapered end of the cylindrical body. After insertion in a predrilled hole, the lugs are extended either by a spring action or mechanically by a shaft passing through the center of the cylindrical body. An external concentric collar on the hollow body supports a shackle for attachment of a cable. A scalloped handle attached to the hollow body at the end adjacent to the shackle permits the collar to be tightened down firmly against the hull after attachment to increase side load bending strength by the lift cable attached to the shackle. The end of the cylindrical body adjacent to the extendable lugs may be tapered to aid in alignment and insertion in a predrilled hole.

12 Claims, 12 Drawing Figures

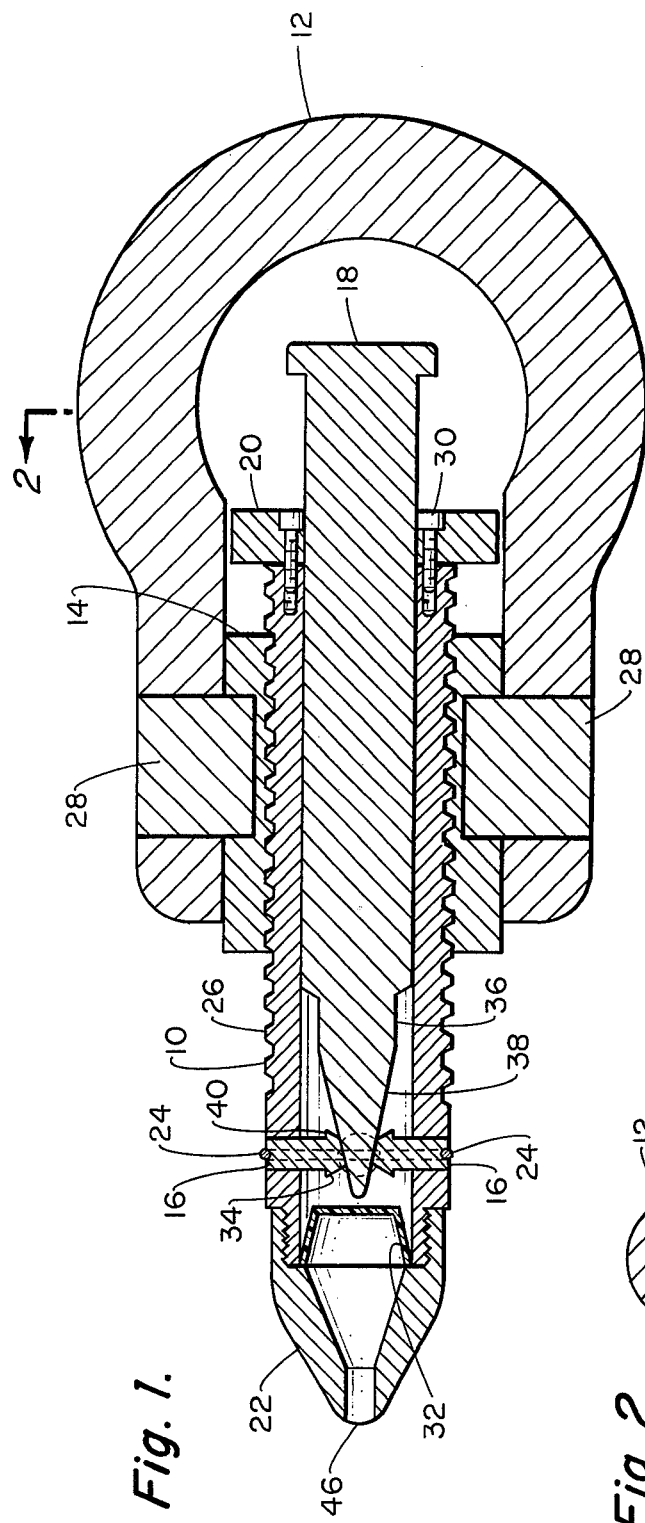
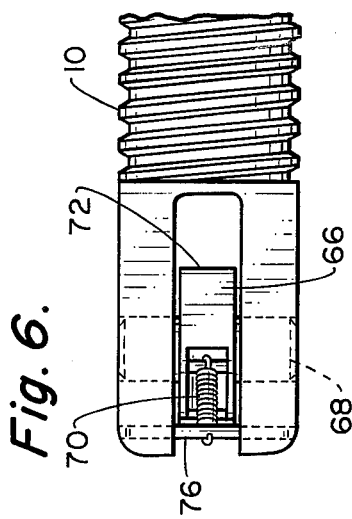
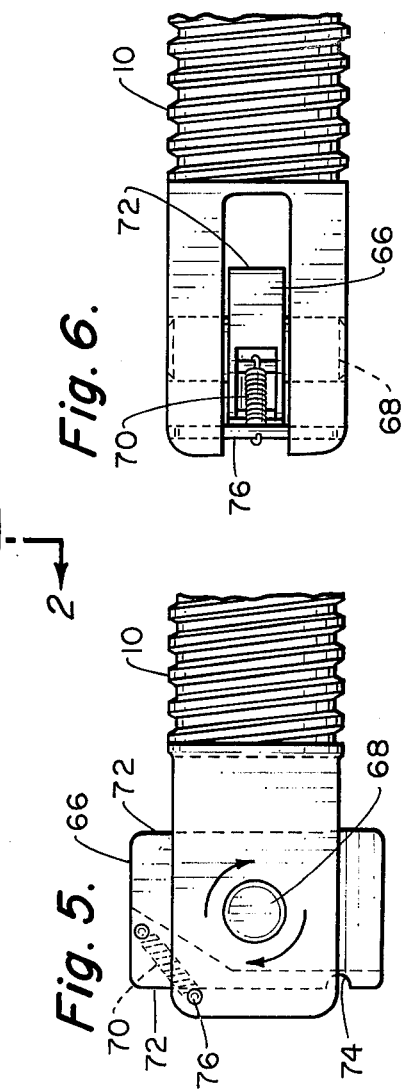
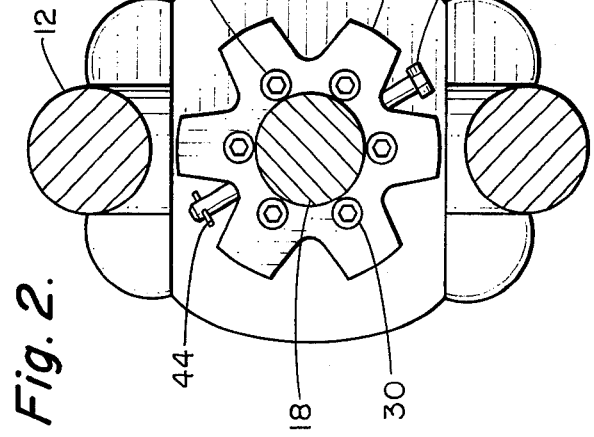

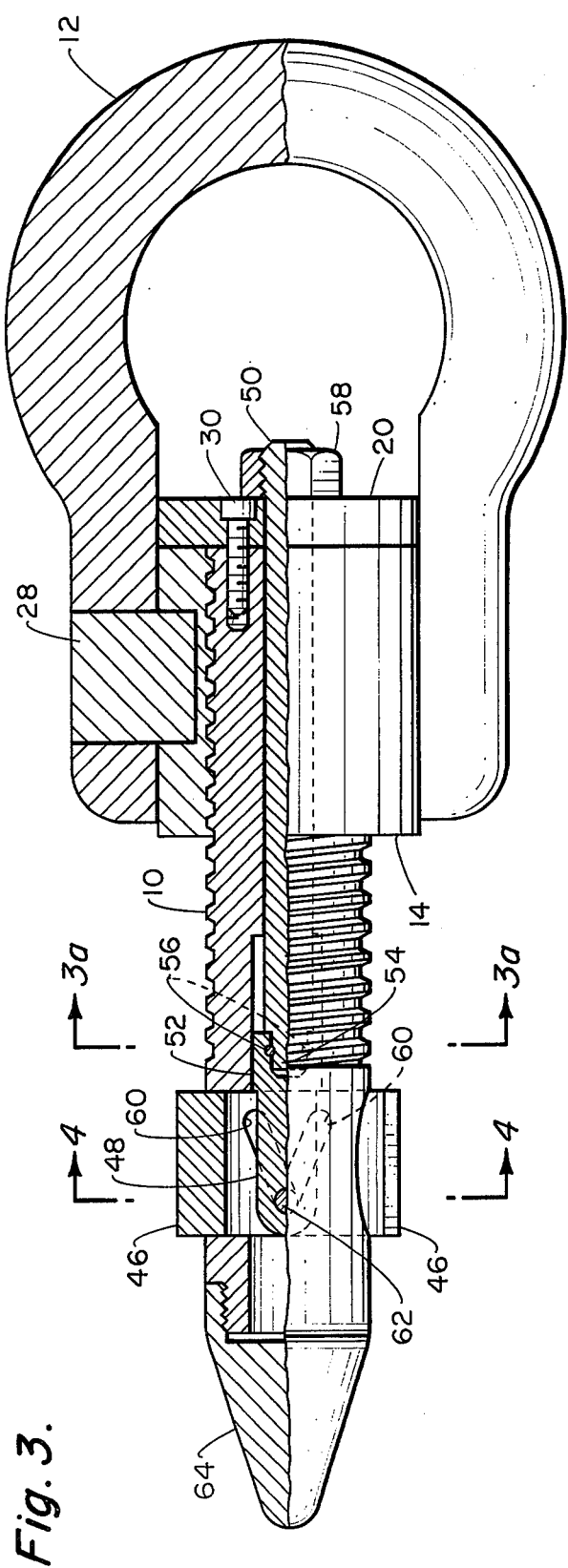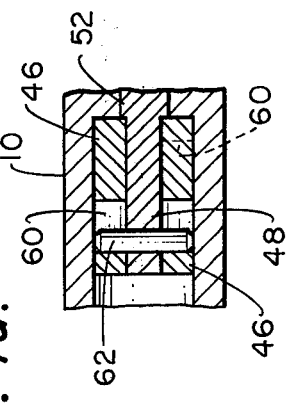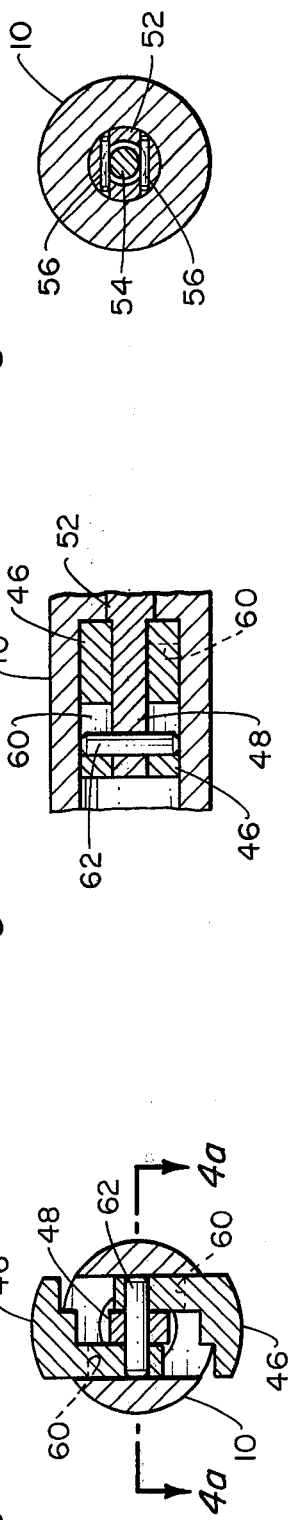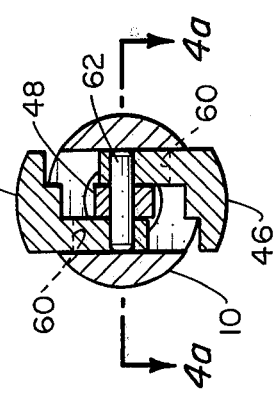

ATTACHMENT DEVICES FOR UNDERWATER SALVAGE

BACKGROUND OF THE INVENTION

This invention relates generally to an attachment device for underwater salvage and more particularly to a salvage attachment lift device for sunken vessels, including extendable lugs, designed for insertion in a predrilled hole.

Underwater salvage attachment devices, when used, have usually been make-shift equipment fabricated at the salvage site. They generally are not fabricated to provide optimum strength to weight ratio or to specifically facilitate diver and/or manipulator use. Prefabricated devices for underwater salvage vary from grapples, for bodily grasping the submerged object, hooks which penetrate the object, to complicated attachment devices which provide apparatus for assisting in connecting cables or other elevating means to the sunken object. These devices generally are complicated and cumbersome with little consideration given to manipulation and attachment underwater by divers. While the operation of these devices is generally satisfactory after attachment, they present problems because of the considerable amount of time and effort which must be expended during attachment because of the necessity of special tools and rigging. The present invention solves these problems by providing a device which is relatively simple to manipulate and attach while still providing the necessary strength for salvaging operations.

SUMMARY OF THE INVENTION

The purpose of this invention is to provide an underwater salvage attachment device which is easy to manipulate and use underwater by a diver, while still providing optimum strength to weight ratio. The attachment device is fabricated from an elongated body which may have a conical tapered end cap for insertion into a predrilled hole. A plurality of lugs supported in one or more holes in the cylindrical body adjacent to the conical end cap are extended by various means after insertion in a predrilled hole. A collar on the opposite end of the hollow body is tightened down against the ship's hull after the lugs have been extended into position. To facilitate tightening down and retention of the collar, a scalloped handle is attached to the cylindrical body adjacent to the collar. A shackle, pivotally mounted on the collar, permits attachment of the cable for lifting a sunken object. Tightening of the collar firmly against the hull increases side load bending strength from the lift cable attached to the shackle. The entire device should be constructed of high corrosion resistant material such as stainless steel.

OBJECTS OF THE INVENTION

It is an object of the present invention to provide an underwater salvage attachment device which is simple and easy to use.

It is another object of the present invention to provide an underwater salvage attachment device fabricated to provide optimum strength to weight ratio.

Another object of the present invention is to provide an underwater salvage attachment device which facilitates underwater manipulation by a diver.

Yet another object of the present invention is to provide an underwater salvage attachment device which can be adjusted to increase side load bending strength after attachment.

Other objects, advantages, and novel features of the invention will become apparent from the following detailed description of the invention when considered in conjunction with the accompanying drawings.

BRIEF DESCRIPTION OF THE DRAWINGS

FIG. 1 is a sectional side elevation of one embodiment of the underwater salvage attachment device.

FIG. 2 is a partial section end view through 2—2 of FIG. 1.

FIG. 3 is a sectional side elevation of a second embodiment of the underwater salvage attachment device.

FIG. 3a is a section through 3a — 3a of FIG. 3.

FIG. 4 is a section through 4 — 4 of FIG. 3.

FIG. 4a is a section through 4a — 4a of FIG. 4.

FIG. 5 is a partial top view of a third embodiment of the underwater salvage attachment device.

FIG. 6 is a side view of the attachment device of FIG. 5.

DETAILED DESCRIPTION OF THE PREFERRED EMBODIMENT

Figure 7:
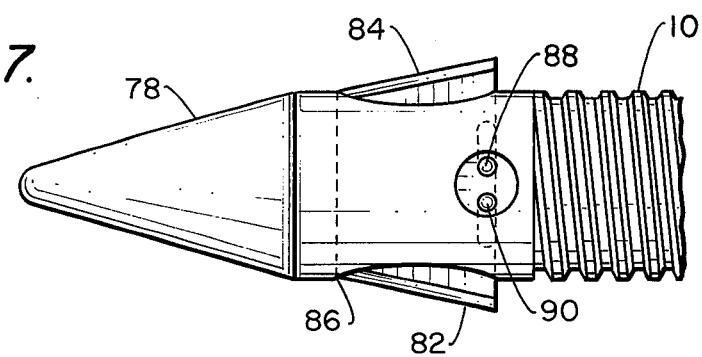
FIG. 7 is a partial top view of a fourth embodiment of the underwater salvage attachment device.

The underwater salvage attachment device is shown in FIG. 1 and is comprised of a hollow elongated body 10 for insertion into a predrilled hole having a shackle 12 attached to a concentric collar 14 supported on the exterior surface of hollow body 10. The device is held in place by a plurality of extendable lugs 16 which are forced outward after insertion into a predrilled hole by spike 18. A conical end cap 22, attached to the end of the hollow body 10, aids in alignment and insertion in the predrilled hole.

The hollow body 10 is preferably constructed of stainless steel and has a helical threaded portion extending from the end adjacent to the shackle to near the extendable lugs 16. The external threaded portion mates with internal threads on collar 14. The extendable lugs 16 may be of any suitable shape, preferably cylindrical, and are seated in apertures at the interior end of the hollow body 10. An expansion type snap ring 24 holds the extendable lugs 16 flush with the exterior surface of the hollow body 10 and is seated in a groove in the hollow body aligned with slots in the extendable lugs 16. The interior end of the lugs 16 have tapered portions 34 terminating in a shoulder 40 which limits the amount of extension of the lugs. Preferably there are four of the extendable lugs 16 equally spaced around the hollow body 10.

The lugs 16 are forced outward by spike 18 fitted inside of the hollow body 10. The outward force is supplied by tapered end 38 of spike 18, engaging the tapered portion 34 of lugs 16. The lugs 16 ride upward on the spike to the neck portion 36 when the spike is completely engaged. The lugs 16 may be held in the extended position by an interference fit between taper 34 and neck 36.

Conically tapered end cap 22 screws onto machine threads at the end of hollow body 10. Aperture 46 in end cap 22 permits the spike 18 to be driven outward for removal of the attachment device for reuse. A plastic end plug 32 seals the internal area of the hollow body 10 from the outside environment after lubrication and assembly of the spike 18 and tapered lugs 16. The end plug 32 is sufficiently thin to permit piercing by spike 18.

Shackle 12 is attached by pins 28, which are force-fitted into the collar 14 with shackle 12 free to rotate. The shackle 12 may be attached to the collar before or after the collar is threaded on hollow body 10. A scalloped handle 20 is attached to the end of the hollow body 10 by a plurality of screws 30 after the shackle-collar assembly has been mounted on the body 10. The handle 20 provides a grip for holding the body 10 while tightening the collar 14 against a bulkhead after attachment to a sunken object. The handle 20 also serves the additional purpose of providing a flange for retention of the collar 14.

During assembly, lugs 16 and spike 18 are fully lubricated and plastic cap plug 32 inserted to prevent moisture and dirt from entering the interior lubricated areas. After assembly, a bolt 42 (see FIG. 2) is inserted in a hole through spike 18 and hollow body 10 and held in place by a cotter pin 44. This bolt 42 acts as a safety device to prevent the spike 18 from being pushed inward prior to any anticipated use of the device. With the bolt 42 in place, the user knows the device is ready for use. The cotter pin 44 and bolt 42 are removed prior to a diver taking the device underwater for use. If desired, a second hole in spike 18 can be provided for reinsertion of the bolt 42 after the device has been attached, in order to prevent the spike 18 from working out of the hollow body 10.

In operation, the device is inserted in a predrilled hole and the spike 18 driven in to force lugs 16 outward and hold them in place via flat neck portion 36. The collar 14 is then tightened down against the object by gripping handle 20 and turning the shackle 12 or vice versa.

A variation of the embodiment shown in FIG. 1 is illustrated in FIG. 3. In this figure, the hollow body 10 is substantially the same with the shackle 12 attached to collar 14 threaded on the body in the same manner. Scalloped handle 20 is also fitted on the hollow body 10 as before. However, in this embodiment two interlocking lugs 46 (see FIG. 4) are extended by the action of a shaft comprised of lug driver arm 48 attached to a threaded rod 50. The threaded rod 50 ia attached to the driver arm 48 by a nipple 54 seated in a socket 52 and held in place by pins 56. This permits driver arm 48 to move in or out when rod 50 is rotated clockwise or counter-clockwise, respectively. Hex head nut 58 attached to the exterior end of rod 50 facilitates rotation with a wrench.

The lugs 46 are shown in their extended position with lug driver arm 48 fully seated. The lugs 46 are extended and retracted by the action of pin 62 in oppositely angled slots 60 in each of the lugs 46 (FIG. 4a). The pin 62 is press fitted in a hole in the end of driver arm 48 (see FIG. 4) and slides freely in slots 60. The lugs 46 are retracted by rotating hex nut 58 counter-clockwise until pin 62 reaches the full extent of its travel to the right in slots 60. The lugs 46 will then be flush with the outside surface of hollow body 10 and the threaded rod will extend a distance outward from the end of the body. A conically tapered end cap 64 is attached to the end of the hollow body 10 as before, except that it has no aperture.

In operation, the device is inserted in a predrilled hole with lugs 46 fully retracted. The hex nut 58 is then rotated clockwise, moving the driver arm 48 to the left, causing lugs 46 to be extended. After the lugs 46 are fully extended (i.e., pin 62 full seated in slots 60), the collar 14 is tightened down on the hull by gripping handle 20 and turning shackle 12 as before. The advantage of this embodiment is that the lugs may be retracted and the device removed more readily while still providing a great strength to weight ratio.

A third embodiment is illustrated in FIG. 5 in which only the lug end of the body is shown for clarity. In this embodiment, the body 10 has exterior threads but is not hollow as before. The collar 14 and shackle 12 are mounted on the body 10 as in the first two embodiments. Also, scalloped handle 20 is attached to body 10 in the same manner. However, in this embodiment, the extendable lugs are provided by a rotatable plate 66, attached to the end of the body 10 by a pin 68. A spring 70, attached to plate 66, retains it in the extended position. When rotated 90° clockwise (see FIG. 5), the edges 72 are flush with the exterior surface of body 10. With plate 66 in this position, notch 74 in plate 66 provides clearance for spring retaining pin 76, which acts as a stop.

In operation, the device is inserted in a predrilled hole with rotatable plate 66 held in the closed position (i.e., lugs retracted). When the device is fully inserted in the predrilled hole, the spring 70 automatically rotates the lug plate 66 counter-clockwise to the extended lug position. The collar 14 is then tightened down as before. This embodiment is more readily adapted for diver manipulation and is quicker to attach but is not as preferred because it does not provide the great strength of the previous embodiments.

Figure 8:
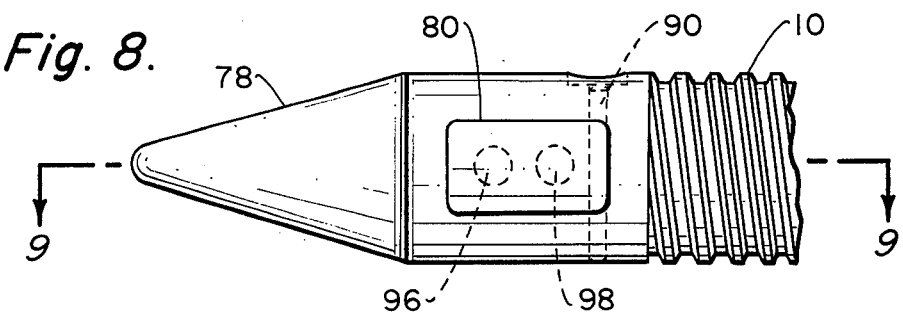
FIG. 8 is a side view of the attachment device of FIG. 7.
Figure 9:
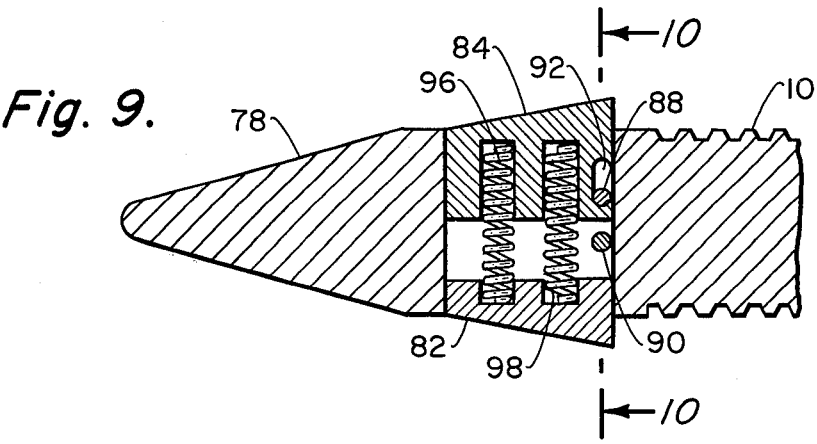
FIG. 9 is a section through 9 — 9 of FIG. 8.
Figure 10:
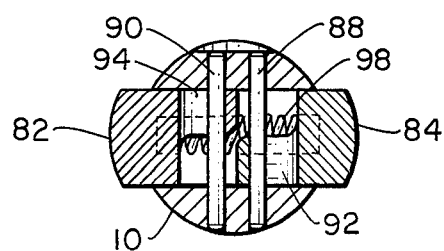
FIG. 10 is a section through 10 — 10 of FIG. 9.

A fourth embodiment is illustrated in FIG. 7 in which only the end of the body 10 containing the extendable lugs is shown, since the shackle and collar on the opposite end are the same as before. The body 10 is solid and has a tapered conical tip 78 and a rectangular slot 80 (FIG. 8) passing through the body. The lugs 82 and 84 have a cam surface tapered outward so that when installed they are flush with the external surface of the body at 86. The lugs 82 and 84 are held in place by retaining pins 88 and 90 engaging slots 92 and 94 (FIG. 9). Springs 96 and 98 fitted into holes between the lugs 82 and 84 maintain the lugs in the open (i.e., extended) position. The lugs 82 and 84 are constructed as shown in FIG. 10 so that they can intermesh when the salvage device is being inserted in a hole and a force is being applied to the tapered cam surface of the lugs 82 and 84.

In operation, this latter embodiment is inserted in a predrilled hole with the tapered conical portion 78 guiding the device into the hole. The lugs 82 and 84 are compressed by the action of the hole on the tapered cam surfaces until they are flush with the surface of the body and the device can pass through the hole. When it is fully inserted, the springs 96 and 98 force the lugs 82 and 84 outward, locking the device in the predrilled hole. The collar 14 and shackle 12 are then tightened down against the hull as before. This latter embodiment has the advantage of being the easiest to manipulate by an underwater diver, and it is especially useful in confined situations. The strength to weight ratio is not as great as the first two embodiments and it is not retractable as is the embodiment of FIG. 3.

Thus, there has been disclosed a variety of underwater salvage attachment devices which are advantageous in that they are relatively simple to manipulate while still providing a high strength to weight ratio. Various alternatives will become apparent to those skilled in the art. For example, a single spring could be substituted for the two springs in the embodiment of FIG. 9. However, it is not as desirable since it may not provide the uniform expansion that the two-spring configuration does.

Obviously, many modifications and variations of the present invention are possible in light of the above teachings. It is therefore to be understood that within the scope of the appended claims the invention may be practiced otherwise than as specifically described.

We claim:

1. An attachment device for underwater salvage comprising:
   a. an elongated cylindrical body;
   b. an external concentric collar adjustably mounted on said body toward one end thereof;
   c. a shackle for cable attachments pivotally mounted on said collar, forming a shackle-collar assembly; said shackle being free to rotate on said collar;
   d. a plurality of extendable lugs supported in at least one aperture in the opposite end of the body from the shackle-collar assembly;
   e. means in said cylindrical body for extending said lugs after insertion of the device in a predrilled hole;
   f. means for adjusting the collar in a direction parallel to the longitudinal axis of said cylindrical body;
   g. said means for adjusting the collar comprises a helical thread on said body and a handle rigidly attached to the shackle end of said body to facilitate tightening down and retention of the collar, whereby the device may be securely tightened against an object after attachment to increase side load bending strength, and provide ease in manipulation by an underwater diver and a high strength to weight ratio.

2. The attachment device of claim 1 wherein the lug end of said body has a conically tapered tip to aid in insertion of said device in a predrilled hole.

3. The attachment device of claim 2 wherein:
   a. said body is hollow, and said means for extending the lugs comprises a shaft movably inserted in said hollow body to forcibly extend the lugs when the shaft is moved into said body along the longitudinal axis.

4. The attachment device of claim 1 wherein the extendable lugs are provided by a rectangular rotatable plate seated in a slot in the end of said body, and the means for extending the lugs comprises a spring biased to rotate the plate into a position where the long axis of the plate is perpendicular to the axis of the body.

5. The attachment device of claim 4 wherein said rectangular plate has a width not greater than the diameter of the body so that when the plate is rotated 90° it is flush with the exterior surface of the body to permit insertion into a predrilled hole.

6. An attachment device for underwater salvage comprising:
   a. an elongated cylindrical body;
   b. an external concentric collar adjustably mounted on said body toward one end thereof;
   c. a shackle attached to said collar;
   d. a plurality of extendable lugs supported in at least one aperture in the opposite end of the body from the concentric collar and shackle;
   e. means for extending said lugs after insertion of the device in a predrilled hole;
   f. said lug end of said body has a conically tapered tip to aid in insertion of said device in a predrilled hole;
   g. means for adjusting the collar in a direction parallel to the axis of said body;
   h. said means for adjusting the collar comprises a helical thread on said cylindrical body and a handle rigidly attached to the shackle end of said body to facilitate tightening down and retention of the collar, whereby the device may be securely tightened against an object after attachment to increase side load bending strength;
   i. said cylindrical body being hollow and said means for extending the lugs comprises a shaft movably inserted in said hollow cylindrical body to forcibly extend the lugs when the shaft is moved into said body along the longitudinal axis;
   j. said lugs being comprised of a plurality of equally spaced pins perpendicular to the axis of said body, and having their interior end conically tapered and terminating in a shoulder acting as a stop to limit their extension;
   k. a resilient circular snap ring engaging a groove in the exterior surface of said cylindrical body and a slot in each lug for retaining said lugs flush with the exterior surface of said body during insertion in a predrilled hole; and
   l. said shaft being comprised of a spike having a tapered tip terminating in a flat neck portion whereby said spike forces said lugs outward when it is driven into said body.

7. The attachment device of claim 6 wherein there are four lugs equally spaced around the periphery of said body.

8. The attachment device of claim 7 wherein the diameter of the neck portion of said spike is chosen to create an interference fit with the lugs thereby forcibly restraining the lugs from movement.

9. The attachment device of claim 8 wherein the conically tapered tip comprises:
   a. an end cap threaded on said body, said end cap having an aperture whereby the spike may be hammered out for removal of the attachment device; and
   b. a plastic end plug inserted in the end of the hollow body between the end cap and spike for sealing out dust and moisture prior to use.

10. An attachment device for underwater salvage comprising:
   a. an elongated cylindrical body;
   b. an external concentric collar adjustably mounted on said body toward one end thereof;
   c. a shackle attached to said collar;
   d. a plurality of extendable lugs supported in at least one aperture in the opposite end of the body from the concentric collar and shackle;
   e. means for extending said lugs after insertion of the device in a predrilled hole;
   f. said lug end of said body has a conically tapered tip to aid in insertion of said device in a predrilled hole;
   g. means for adjusting the collar in a direction parallel to the axis of said body;

h. said means for adjusting the collar comprises a helical thread on said cylindrical body and a handle rigidly attached to the shackle end of said body to facilitate tightening down and retention of the collar, whereby the device may be securely tightened against an object after attachment to increase side load bending strength;

i. said cylindrical body being hollow and said means for extending the lugs comprises a shaft movably inserted in said hollow cylindrical body to forcibly extend the lugs when the shaft is moved into said body along the longitudinal axis;

j. said lugs being comprised of two metal pieces contoured to intermesh when retracted, fitted in a rectangular aperture in said body, said lugs each having a longitudinal slot diverging in opposite directions from a point on the axis of said body outward; and k. said shaft comprising a rod threaded into said body and a driver arm attached to the interior end of said rod; said driver arm having a pin passing through the arm and engaging the slot in each lug whereby said lugs are extended when the rod is threaded into the body and retracted when the rod is threaded out.

11. The attachment device of claim 10 wherein means is securely attached to said rod for threading it in and out.

12. An attachment device for underwater salvage comprising:
  a. an elongated cylindrical body;
  b. an external concentric collar adjustably mounted on said body toward one end thereof;
  c. a shackle attached to said collar;
  d. a plurality of extendable lugs supported in at least one aperture in the opposite end of the body from the concentric collar and shackle;
  e. means for extending said lugs after insertion of the device in a predrilled hole;
  f. said lug end of said body has a conically tapered tip to aid in insertion of said device in a predrilled hole;
  g. means for adjusting the collar in a direction parallel to the axis of said body;
  h. said means for adjusting the collar comprises a helical thread on said cylindrical body and a handle rigidly attached to the shackle end of said body to facilitate tightening down and retention of the collar, whereby the device may be securely tightened against an object after attachment to increase side load bending strength;
  i. said lugs being comprised of two metal pieces contoured to intermesh when retracted, fitted into a rectangular aperture in said body;
  j. said lugs having longitudinal cam surfaces tapering outward from a point flush with said body when extended;
  k. means retaining said lugs in said body; and
  l. said means for extending said lugs comprising at least one spring between said lugs, engaging a countersunk hole in each lug; and
  m. said spring being biased against any force applied to the cam surfaces whereby said lugs are forced inward during insertion in a predrilled hole and automatically extended when they pass through the hole.

* * * * *